United States Patent Office 3,440,385
Patented Apr. 22, 1969

3,440,385
ELECTRONIC OVENS
Peter Harold Smith, Jangada, England, assignor to Microtherm Limited
Filed Oct. 13, 1966, Ser. No. 586,429
Claims priority, application Great Britain, Oct. 13, 1965, 43,522/65; Nov. 4, 1965, 46,841/65
Int. Cl. H05b 9/06
U.S. Cl. 219—10.55
10 Claims

ABSTRACT OF THE DISCLOSURE

This disclosure relates to a microwave oven having a turntable for rotating a food article to be heated, and a shelf connected to the front wall of the oven. An opening in the front wall is adapted to be closed by a door which is slidable relative to the shelf. A pair of spaced apart bars are connected to the door and are adapted to move therewith between a position inside the oven and a position in which the bars are withdrawn from the oven. A food article is adapted to be moved by the bars from the shelf to the turntable, and back, during a heating operation. Air is forced past the microwave source, and into the oven in order to pressurize the oven and remove excess moisture.

---

This invention relates to electronic ovens, particularly of the kind where heating energy is radiated in an oven chamber in operation.

It is an object of one aspect of the invention to provide means for displacing heated articles out of the oven chamber to an accessible position, through an aperture which is normally closed by a door, and this aspect of the invention provides an oven comprising an oven chamber extending from a first wall, said first wall having an aperture therein, a source of heating energy coupled to radiate the energy into the oven chamber, a rotatable support member extending transverse to said first wall inside the oven chamber for supporting and rotating an article to be heated during heating, shelf means extending transverse to said first wall for supporting the article outside the oven chamber, the support surfaces of said support member and said shelf means being aligned with each other and with said aperture, article displacement means for displacing the article at least from said support member to said shelf means through said aperture, and door means for closing said aperture.

It is a general object of another aspect of the invention to ventilate the oven chamber. It is a more particular object of this aspect of the invention to expel excess moisture from the cavity during heating, and a particular advantage of this aspect of the invention is that the means for ventilating the oven chamber is combined with means for cooling the source of radiant heating energy, the combination resulting in improved ventilation, and more economical operation. This aspect of the invention provides an electronic oven comprising a source of radio frequency electromagnetic energy, a plurality of conductive wall members co-operating to define an oven chamber for receiving an article of food to be heated, at least a part of a first one of said walls being displaceable to provide access to the interior of the oven chamber, coupling means for coupling heating energy from said source to the oven chamber through at least a second one of said walls, blower means for passing a stream of air over said source, whereby to cool the source, and duct means for guiding at least part of the stream of air from said source to the oven chamber, at least two of said walls having a plurality of perforations therein to permit air to flow respectively into and out of the oven chamber.

Other features and advantages of the invention will appear from the following description of an embodiment thereof, given by way of example with reference to the accompanying drawings, in which.

Figure 1:
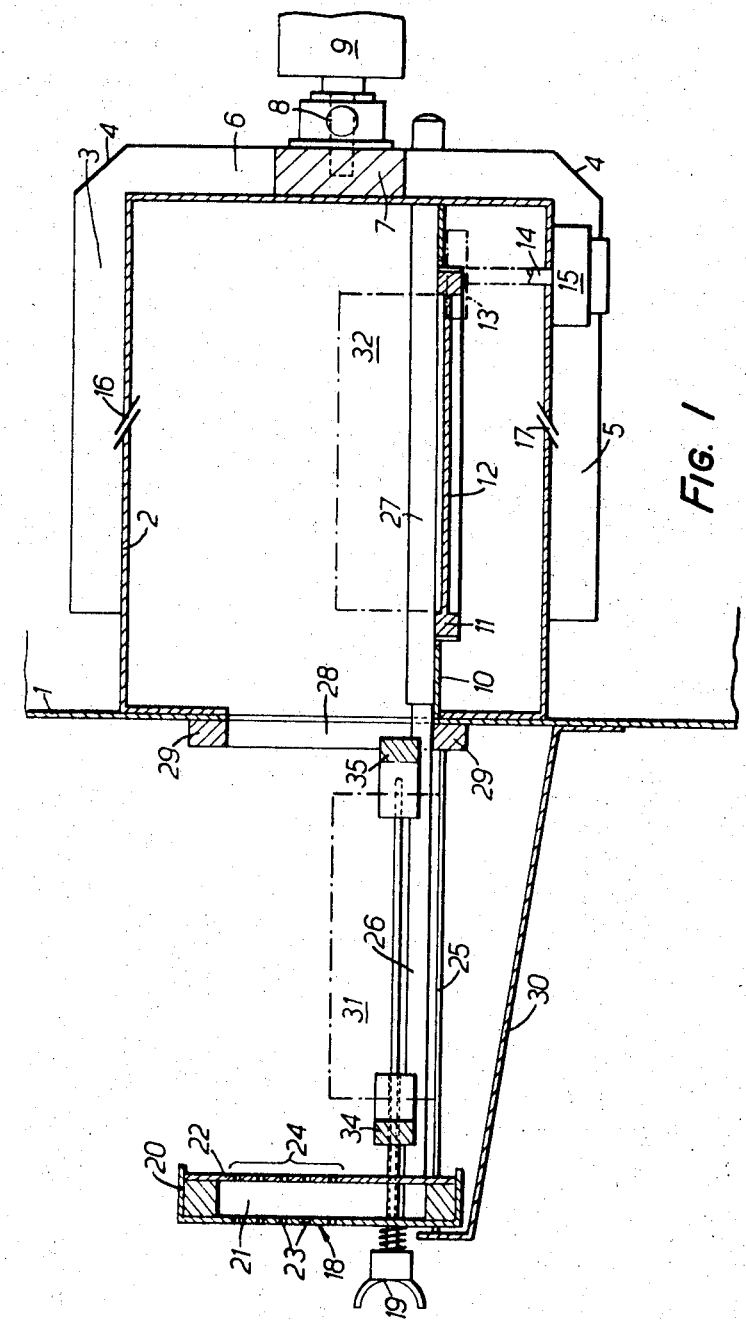
FIGURE 1 is a sectional view showing in elevation a microwave oven in accordance with the invention.
Figure 2:
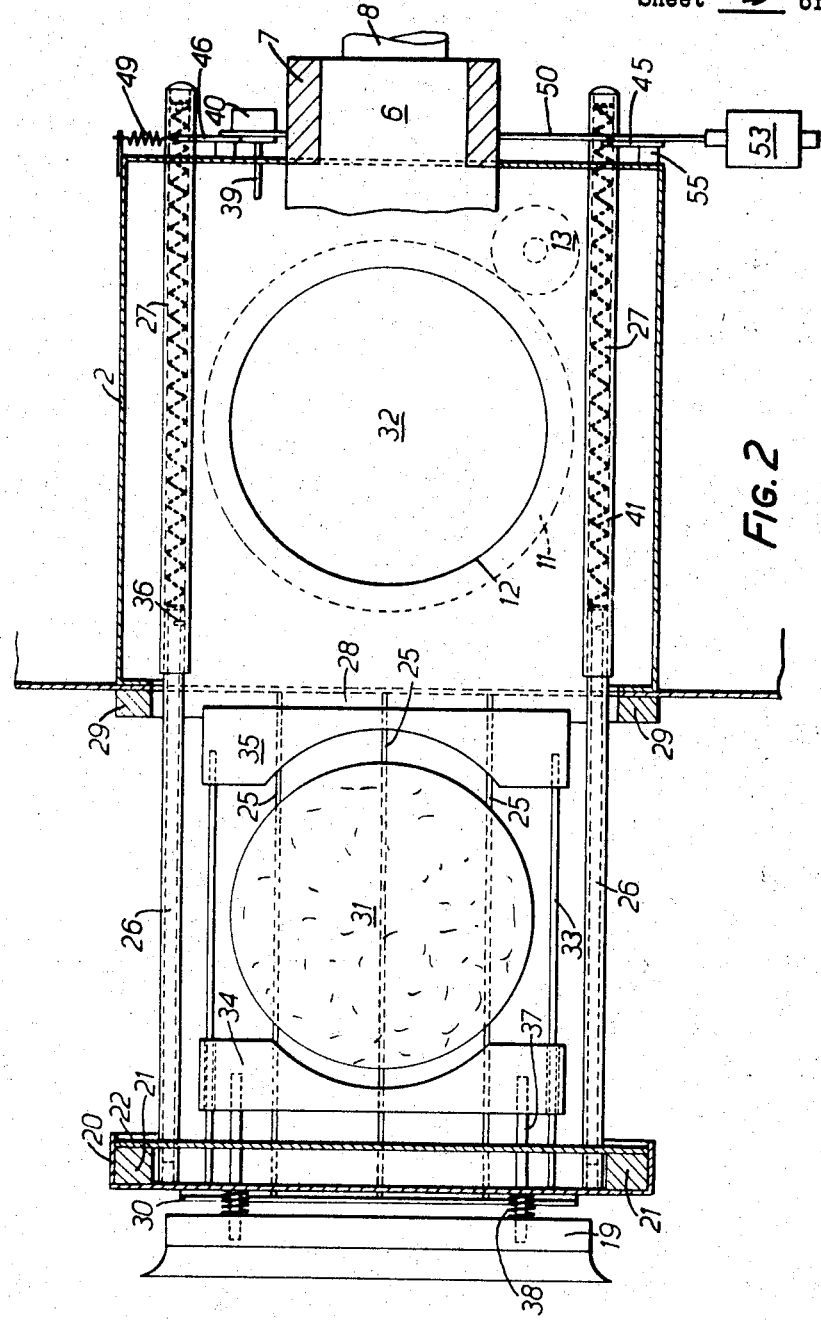
FIGURE 2 is a sectional view showing the oven in plan.

The embodiments of the invention shown in the drawings are particularly intended for heating articles of food. The oven shown in FIGURES 1 to 5 comprises an oven cavity having a door aperture in its front wall, and the oven door is mounted on telescopic guides for movement over an external shelf towards and away from the door aperture. An article to be heated may be placed on the shelf when the door is opened, and on pushing the door shut, an insertion member inserts the article into the oven and positions it in the correct heating position in the oven, and a switch is actuated to enable the heating cycle to start. At the end of the heating cycle, the door moves forwardly automatically under spring bias and a withdrawal member moves the heated article forwardly out on an accessible position on the shelf.

The article is rotated on a turntable in the oven during heating so as to make the heating more uniform. The insertion member is mounted from the door handle and the two together can move relative to the door against spring bias when the door handle is pushed to close the door. When the handle is then released, the spring bias displaces the insertion member out of engagement with the article to be heated, to enable the article to rotate freely with the turntable.

Referring particularly to FIGURE 1 of the drawings, the oven comprises an oven cavity structure 2 secured to a front panel 1 of the apparatus. Any suitable arrangement may be used to supply heating energy to the cavity, and conveniently this is of the type described in Patent No. 3,210,511, issued Oct. 5, 1965, as shown. In this arrangement, the cavity structure 2 carries upper and lower arms 3 and 5 of a branched wave guide coupled to a magnetron 9 through a feed wave guide 6 and corner elbows 4. Coupling to the arms 3 and 5 is effected through respective slots 16 and 17 which are arranged to extend mutually perpendicularly, and the article receives a balanced exposure to micro-wave radiation from the slots 16 and 17.

A shelf 10 mounted from the side walls of the cavity extends across the cavity in line with the bottom edge of the door aperture 28, and is provided with a central turntable 12 for supporting the article to be heated in a central position in the cavity 2 between the slots 16 and 17. The turntable 12 is mounted for rotation in a circular aperture in the shelf 10, and is driven through a pinion wheel 13 meshing with a peripheral gear 11 on the turntable, the pinion wheel being mounted on a shaft 14 of a drive motor 15 which is mounted outside the cavity. The shelf, turntable, and drive shaft are constructed from low loss dielectric material.

The door assembly 18 is mounted on rods 26 which slide in sleeves 27, the sleeves 27 being secured to the upper side of shelf 10. The door assembly 18 comprises an outer cover 20 having a peripheral flange which is arranged to fit over a co-operating metal surround 29 to the door aperture 28. A thin flexible stainless steel plate 22 is mounted at its edges on a foam rubber cushion 21 in the cover plate 20. The plates 20 and 22 are perforated as at 23 and 24 to provide ventilation holes, the cushion 21 having a corresponding aperture. When the door is closed, the guide rods 26 telescope in the sleeve 27, and the plate 22 contacts the face of the aperture surround block 29. With the door pushed home, the cushion 21 ensure positive contact between the plate 22 and the surround 29, and the arrangement provides an effective seal against microwave radiation.

The guide rod arrangement 26 and 27 guides the door for movemet towards and away from the aperture 28 over an external shelf assembly comprising a plurality of grid wires 25 at the level of the shelf 10, strung through the door between the panel 1 and a support plate 30 which projects out from panel 1. The grid wires 25 pass through apertures cut near the bottom of the door assembly 18 which allow free movement of the door. The support plate 30 also forms a stop to limit outward travel of the door assembly.

An article to be heated may be placed on the support grid 25 in the position indicated at 31 when the door is opened, and it is arranged that when the door assembly is closed by pushing on a handle 19, it takes with it the article to be heated and positions it on the turntable 12 in the position indicated at 32, leaving the article free to rotate with the turntable 12 when the handle 19 is released. To this end the handle 19 is mounted on rods 37 which pass through the plates 20 and 22 of the door assembly with compression springs 38 fitted between the handle and the cover plate 20. On the other end of the rods 37 an insertion bar 34 is mounted which has a recess cut in one side face. When the door is pushed home, compressing the cushion 21, the handle 19 moves forward with the insertion member 24 relating to the plate 20 to advance the article to its correct position on the turntable 12. When the handle 19 is released, the insertion member 34 moves out of engagement with the article.

A withdrawal bar 35 is also provided to draw the heated article out of the oven cavity. The bar 35 is similar in shape to the bar 34, and is mounted from the cover plate 20 on rods 33. The withdrawal bar 35 is also arranged to engage a dielectric pin 39 to actuate a micro-switch 40 when the door is fully closed, a micro-switch 40 controlling the supply of micro-wave energy to the oven.

Figure 3:
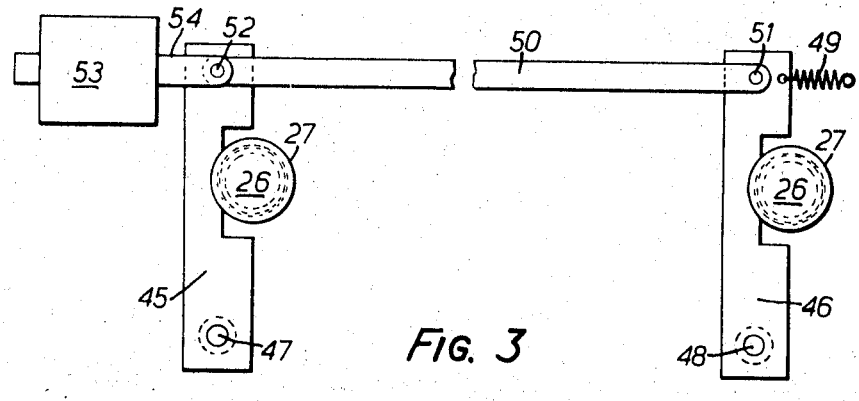
FIGURE 3 is a sectional detailed view showing a release mechanism for the oven.
Figure 4:
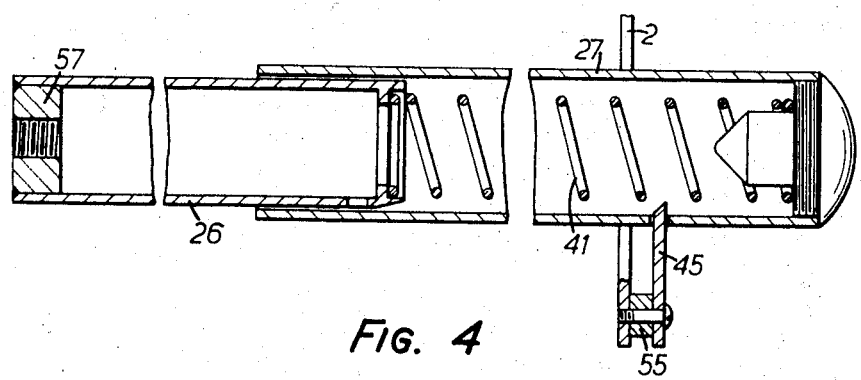
FIGURE 4 is another sectional detailed view showing a telescopic guide rod for the oven with the release mechanism.

A release mechanism is provided so that the door is sprung open automatically at the end of the heating cycle, drawing the heated article out on to the grid wires 25. Referring to FIGURES 3 and 4, compression springs such as 41 are provided in the two guide sleeves 27 to urge the tubes 26 outwardly, and a detent is provided to hold the door shut against the action of these return springs. The guide sleeves 27 extend out through the back wall of the cavity 2, and grooves are cut near the ends of the sleeves to accommodate pawls 45 and 46. Corresponding grooves are cut near the ends of tubes 26, and when the door is fully shut, the pawls 45 and 46 can drop into these grooves to latch the door shut. The pawls 45 and 46 are mounted at one end for rotation on pivots 47 and 48, with washers such as 55 spacing the pawls from the back wall of the cavity. The pawls are connected by a tie-rod 50 which is pivoted on the ends of the pawls opposite pivots 47 and 48 on pivots 51 and 52. The armature 54 of a solenoid 53 is connected to the pawl 45, and when the solenoid 53 is energised, the pawls are pulled out of the grooves in the support tubes 26, to allow the return springs 41 to open the door. A tension spring 49 is connected to the pawl 46 to bias the pawls into the detent grooves. FIGURE 4 also shows an end plug 56 for one of the tubes 27 which provides a stop for the return spring 41, a central projection on the plug holding the end of the spring 41 central in the sleeve 27.

Figure 5:
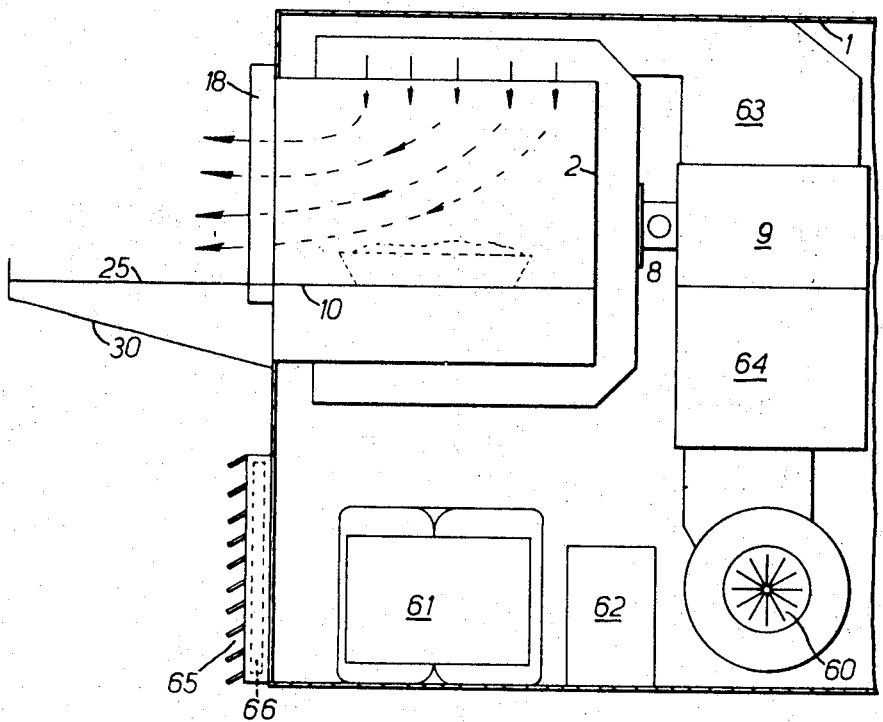
FIGURE 5 is a schematic diagram showing the layout of the oven.

FIGURE 5 shows a general layout of the microwave oven, and it is seen that the shelf 10 and grid wires 25 are aligned so as to make a continuous platform for insertion and withdrawal of the article to be heated, which is shown at 64. The magnetron 9 is mounted behind the cavity 2. On the floor of the cabinet, below the cavity 2 are mounted the main power transformer 61 and a transformer 62 for supplying filament heating current to the magnetron.

The dissipation of the magnetron may be of the order of a few kilowatts, and it is therefore cooled by means of a motor-driven blower 60. Cooling air is drawn by the blower 60 through an inlet louvre 65 with an air filter 66, over mains transformers 61 and 62, and passed into a duct 64 which guides the stream of air around the magnetron. The air becomes heated, and this heated air is passed through a further air duct 63 which surrounds the waveguide arm 3, and may be arranged to pass also through the interior of the waveguide. In the wall on which the waveguide arm 3 is mounted are provided a plurality of openings or perforations (not shown) which are dimensioned so that they are a small fraction of a wavelength of the microwave energy, and are therefore not substantially premeable to the electromagnetic radiation, whilst permitting the heated air to pass into the oven cavity. By appropriate design, the heated air, under some pressure, passes through the perforations and is directed on to the article being heated. Thus, some of the thermal content of the heated air is imparted to the product and assists in its heating. The air emerges from the oven through the perforations 23 and 24 in the door 18 which are also dimensioned so that there is only a very small or negligible transmission of microwave energy through the door structure when it is closed.

This ventilation arrangement has substantial advantages, apart from a saving in power in heating a given article. The air which is directed on to the article being heated will be dry. With certain types of articles of food, especially bread and flour confectionary articles, the heating process may give rise to the rapid production of steam and the flow of dry air over the exterior surface of the product will prevent it becoming damp or soggy. Further, the movement of the hot dry air through the heating chamber almost completely eliminates the problem of condensation which can sometimes take place in an oven in which, despite the heating of the article within it, may remain relatively cool. Also, the fact that the cavity is slightly pressurised means that there is no danger of ingress of dust or other contaminants, since there is an outflow of air through the openings which must necessarily be provided in the door.

Figure 6:
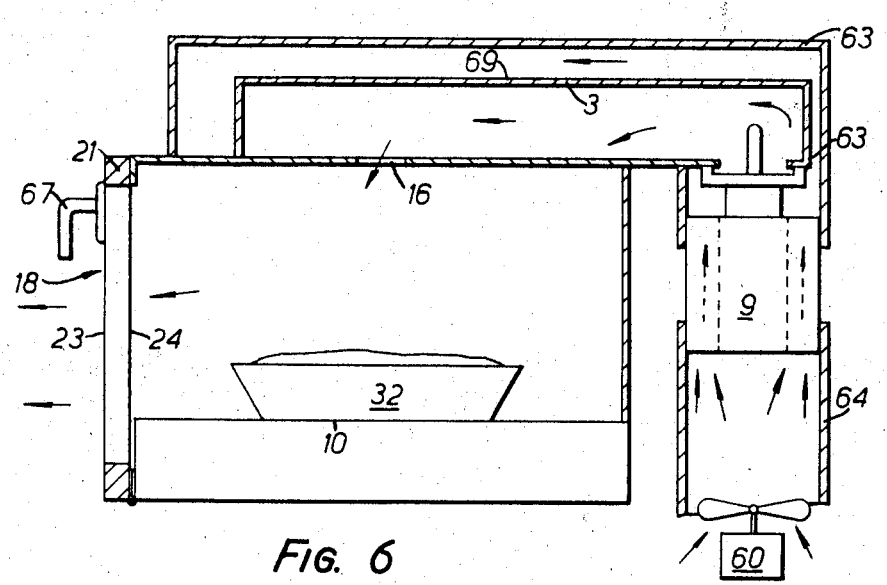
FIGURE 6 is a schematic vertical sectional view illustrating a ventilation arrangement for a microwave oven.
Figure 7:
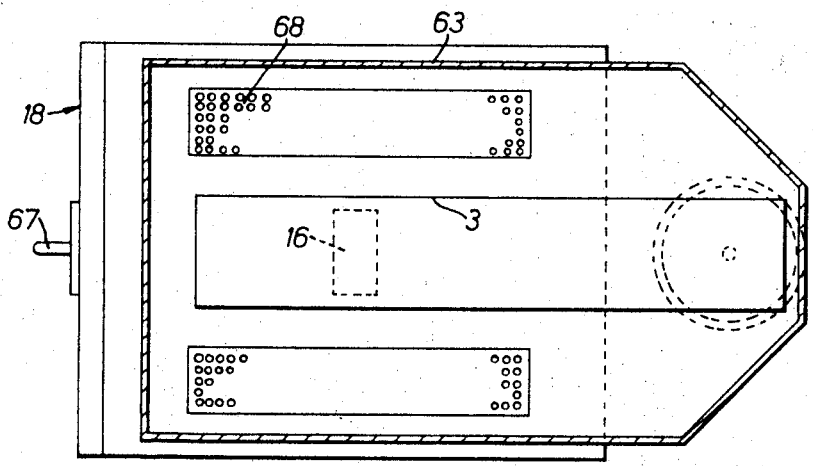
FIGURE 7 is a schematic horizontal sectional view illustrating the ventilation arrangement.

This ventilation arrangement is applicable to microwave ovens with other door arrangements. An example is illustrated in FIGURES 6 and 7. In this oven, the door extends completely over one side of the cavity, the corresponding wall being reduced to a co-operating flange, and the door is hinged at its lower edge. A locking device, operated by a handle 67 may be provided. Similar reference numerals are given in FIGURES 6 and 7 to parts which are similar to parts of the oven shown in FIGURES 1 to 5, the perforations in the coiling of the cavity being indicated at 68. It will be noted that only a single coupling waveguide arm, as at 69 is provided.

What I claim is:

1. An oven comprising an oven chamber extending from a first wall, said first wall having an aperture therein, a source of heating energy coupled to radiate the energy into the oven chamber, a rotatable support member extending transverse to said first wall inside the oven chamber for supporting and rotating an article to be heated during heating, shelf means mounted outside said chamber and extending transverse to said first wall for supporting the article outside the oven chamber, the support surfaces of said support member and said shelf means being aligned with each other and with said aperture, article displacement means for displacing the article at least from said support member to said shelf means through said aperture, and door means for closing said aperture.

2. An oven comprising an oven chamber according to claim 1 wherein said source is a source of radio frequency electromagnetic energy, and comprising a plurality of electrically conductive walls including said first wall, said walls and said door means co-operating for defining the oven chamber.

3. An oven comprising an oven chamber according to claim 1 wherein said article displacement means includes a first member for engaging an edge of an article positioned on said support member, and guide means for guiding said first member for movement relative to said first wall in a direciton substantially normal thereto, said first member being displaceable to push the article from said support member to an accessible position on said shelf means.

4. An oven comprising an oven chamber extending from a first wall, said first wall having an aperture therein, a source of heating energy coupled to radiate the energy into the oven chamber, a rotatable support member extending transverse to said first wall inside the oven chamber for supporting and rotating an article to be heated during heating, shelf means extending transverse to said first wall for supporting the article outside the oven chamber, the support surfaces of said support member and said shelf means being aligned with each other and with said aperture, article displacement means for displacing the article at least from said support member to said shelf means through said aperture, door means for closing said aperture, said article displacement means including a first member for engaging an edge of an article positioned on said support member, and guide means for guiding said first member for movement relative to said first wall in a direction substantially normal thereto, said first member being displaceable to push the article from said support member to an accessible position on said shelf means, and said article displacement means including a second member spaced from said first member for engaging an edge of an article positioned on said shelf means, said said second member being movable with said first member under the guidance of said guide means to push the article from said shelf means to said support member.

5. An oven comprising an oven chamber according to claim 4 wherein said door means comprises a door member which forms an assembly with said first and second members and is movable therewith under the guidance of said guide means between a position in which it abuts said first wall to close said aperture and a position in which it is spaced from said first wall.

6. An oven comprising an oven chamber according to claim 5 and including means for urging said assembly from a closed position in which said door member abuts said first wall towards an open position in which said door member is spaced from said first wall, latch means for latching the assembly in said closed position, and means for disabling said latch means.

7. An oven comprising an oven chamber according to claim 5 and including means for supporting said second member, said means including a handle for moving said assembly, said handle and said second member being displaceable relative to said door member between two limiting positions, and means for moving said second member towards said door member when said handle is released after moving said assembly from said open position to said closed position.

8. An oven comprising an oven chamber according to claim 5 wherein said shelf means includes a plurality of members extending through said door member.

9. An electronic oven comprising a source of radio frequency electromagnetic energy, a plurality of conductive wall members cooperating to define an oven chamber for receiving an article of food to be heated, at least a part of a first one of said walls being displaceable to provide access to the interior of the oven chamber, coupling means for coupling heating energy from said source to the oven chamber through a second wall, blower means for passing a stream of air over said source to cool the source, duct means for guiding at least a part of the stream of air from said source to the oven chamber, whereby said chamber is pressurized, at least two of said walls having a plurality of perforations therein to permit air to flow respectively into and out of the oven chamber, said coupling means including a length of hollow waveguide formed by part of said second wall, said duct means being arranged to guide the air to a pair of perforated regions of said second wall, said waveguide being interposed between said perforated regions on said second wall.

10. An oven comprising an oven chamber according to claim 9 wherein said length of waveguide is coupled to the oven chamber through at least one slot in said second wall, and wherein said coupling means includes an aperture to permit part of said stream of air to pass through said length of waveguide and into the oven chamber through said slot.

References Cited

UNITED STATES PATENTS

| | | | |
|---|---|---|---|
| 2,782,292 | 2/1957 | Long | 219—10.55 |
| 3,127,494 | 3/1964 | Kellough et al. | 219—10.55 |
| 3,127,495 | 3/1964 | Polries et al. | 219—10.55 |
| 3,172,987 | 3/1965 | Fitzmayer | 219—10.55 |
| 3,210,511 | 10/1965 | Smith | 219—10.55 |
| 3,281,568 | 10/1966 | Haagensen | 219—10.55 |
| 3,300,615 | 1/1967 | Smith | 219—10.55 |
| 3,339,054 | 8/1967 | Deaton | 219—10.55 |

FOREIGN PATENTS 1,249,130 11/1960 France.

RICHARD M. WOOD, *Primary Examiner.*

L. H. BENDER, *Assistant Examiner.*